United States Patent [19]

Aston et al.

[11] Patent Number: 4,475,936
[45] Date of Patent: Oct. 9, 1984

[54] APPARATUS FOR THE HEAT PROCESSING OF PARTICULATE MATERIALS

[75] Inventors: Geoffrey W. Aston; Roderick M. Smart, both of Horsham, England

[73] Assignee: Redland Technology Limited, Surrey, England

[21] Appl. No.: 465,611

[22] Filed: Feb. 10, 1983

[30] Foreign Application Priority Data

Feb. 12, 1982 [GB] United Kingdom ................. 8204114

[51] Int. Cl.$^3$ ............................................. C03B 19/10
[52] U.S. Cl. ......................................... 65/142; 65/21.3
[58] Field of Search .................................. 65/21.3, 142

[56] References Cited
U.S. PATENT DOCUMENTS

| | | | |
|---|---|---|---|
| 2,838,881 | 6/1958 | Plumat | 65/142 |
| 2,978,339 | 4/1961 | Veatch et al. | |
| 3,133,805 | 5/1964 | Robinson | 65/142 |
| 3,138,444 | 6/1964 | Searight et al. | 65/21.3 |
| 3,151,965 | 10/1964 | Patterson | 65/21.3 |
| 3,230,064 | 1/1966 | Veatch et al. | 65/142 |
| 4,385,917 | 5/1983 | Aston et al. | 65/21.3 |

FOREIGN PATENT DOCUMENTS

| | | |
|---|---|---|
| 495779 | 9/1950 | Belgium . |
| 0046376 | 2/1982 | European Pat. Off. . |
| 1161396 | 10/1958 | France . |
| 740145 | 11/1955 | United Kingdom . |

*Primary Examiner*—Robert Lindsay
*Attorney, Agent, or Firm*—Young & Thompson

[57] ABSTRACT

A vortex combustion furnace (1) for the production of glass beads or the like is generally cylindrical and has an outlet flue (24) at its upper end. A burner (13) at the lower end burns a gas/air mixture. Secondary air is introduced into the chamber through tangential air inlets (16) and creates a vortex (71) within the chamber. Tertiary air is introduced through a ring of angled nozzles (71) surrounding the burner further to swirl the flame. The vortex has a top-hat temperature profile with a central heating region with a temperature in excess of 1000° C. and a surrounding cooling region with a temperature not much above ambient. Glass cullet is supplied to a fluidized bed (53) and then entrained in a pipe (44) to be injected into the chamber. The cullet follows a spiral path in the vortex, is heated, melts to form glass beads, is then cooled and finally is collected after striking the wall of the chamber.

11 Claims, 8 Drawing Figures

APPARATUS FOR THE HEAT PROCESSING OF PARTICULATE MATERIALS

This invention is concerned with the heat processing of particulate material, and with combustion chambers or furnaces for use in the heat processing of particulate material.

Particulate materials are heat processed in many types of furnaces, this heat processing being used particularly, but not exclusively, to take the small particles, from a solid phase, temporarily into a liquid phase, in order to convert them from irregular shapes to substantially spherical shapes, this change of shape being caused by surface tension effects whilst in the liquid phase.

A well known example of a material that is processed in this way is glass, the small glass beads that result from the heat processing being of use in a number of ways, for example as a means of introducing reflectivity into traffic lane marking paints or reflective road signs.

Furnaces utilised hitherto have included updraught and downdraught furnaces of either a lazy flame or force flame type wherein cullet, i.e. crushed glass, the particulate material to be processed is charged into the furnace:

(a) at the lower end of the furnace to be thereafter carried upwardly by the combustible gases;

(b) at the upper end of the furnace to be thereafter allowed to fall downwardly under gravitational effects.

In either case the crushed glass cullet is subjected firstly to the heating effects of the furnace and then to the subsequent cooling effects of a quenching zone whereby:

i. particles of crushed glass are raised to a high enough temperature for a sufficient time to be reduced to a transition state;

ii. the transition state particles take the form of beads due to the surface tension phenomenon, i.e. the particles spherulise; and iii. the beads, thus formed, are cooled below their transition temperature to facilitate collection and avoid coalescence with other beads or accretion to walls of the furnace.

The time that particles/beads spend in flight in the furnace is known as the "residence time".

Among the many operating parameters of furnaces for manufacturing glass beads, which parameters have to be closely monitored, is that of the efficiencies of such furnaces. Of late it has become of paramount importance to reduce the amounts of fuel used.

The size of beads produced and the standards of the beads, inter alia, their refractive indexes, are governed by the end uses of the beads. In general, however, it is the production of beads having refractive indexes of approximately 1.4 to 2.1 and diameters of 100 to 1500$\mu$ with which the present invention is particularly though not exclusively concerned.

The efficiency of a furnace in producing glass beads is a function of: (a) the "residence time" of particles of crushed glass in the furnace in relation to the energy supplied to the furnace during that time; (b) the particle density; and (c) the number and size of such particles per unit volume in the furnace. A particle during the "residence time" must have attained its transition state, be formed into a bead and cooled to a state where coalescence and accretion are obviated.

Numerous furnaces for the production of glass beads are known. Thus in United Kingdom Patent Specification Nos. 740145, 875292 and 984655 and U.S. Pat. Nos. 2,947,115; 3,151,965 and 3,190,737 there are disclosed several updraught and one downdraught furnace arrangements and one, see Specification No. 984655, which can only be described as a combination of the two types.

In most of the prior art arrangements it is evident that the "residence time" of a particle is catered for by choosing a long or high substantially linear flight path for the particle and providing a furnace with a long or high flame fed heating zone leading to an appropriate cooling zone.

In the apparatus of Specification No. 984655, however, the flight path which particles are constrained to follow takes the form of a fountain i.e. the particles are projected upwardly and thereafter pass downwardly under the influence of gravity within the constraints imposed by the apparatus on the flow of combusted gases and the beads thus formed fall into a collecting tray or pass outwardly in a radial sinusoidal path to collecting pans.

In United Kingdom Patent Specification No. 740145 there is disclosed a vertically disposed tubular column into which particles of crushed glass are injected along with the combustible gases, the particles being entrained and carried upwardly in the hot gases.

A small intense flame is formed within an orientable rising air current and the rising vehicular gases, together with the particles/beads, pass through cooling zones of increasing intensity. These is thus a temperature gradient upwardly of the column through which the glass particles/beads are constrained to pass.

Extra air is introduced through tangential inlet ports at the top of the column but this is only to speed up those beads which may be losing some of their velocity.

Accretion is obviated by a vibrator device mounted on the wall of the columns.

"Residence time" of particles/beads in the furnace of Specification No. 740145 is regulated within fine limits by adjusting the velocity at which the particles are injected into the flame at the bottom of the column.

In United Kingdom Specification No. 875292 there is disclosed one apparatus, see FIGS. 1 to 3, having a vertically disposed furnace to which a combustible mixture of gas/air is fed together with particles of crushed glass. Beads resulting therefrom pass through a quenching zone to a lower collection bin or through a gas flue in an upper portion of the quenching zone to a cyclone separator. There is a temperature gradient across the quenching zone just upwardly of the furnace where the hot gases pass into the cooling air. In addition the flight paths of particles/beads in the said one apparatus, through the quenching zone, is a function of the bead mass/gravity and/or a function of the bead mass/combusted gas velocity.

In a second apparatus disclosed in FIGS. 6 and 8 of the Specification No. 875292 there is an arrangement of burners 51 which are adjusted to give the combusted gases in the furnace area a spiraling action which tends to equalise the temperature throughout the furnace. A quenching zone is provided immediately above the furnace. Air is allowed to enter the apparatus at entry ports 76 below the furnace, see FIG. 6, the purpose of the air being partly to aid combustion and partly to avoid accretion of the particles/beads to the furnace walls.

Beads formed in this apparatus are collected through an upper flue and a cyclone separator.

The temperature gradient in the second apparatus is again seen to be heightwise of the apparatus, i.e. substantially colinear with the flight path of the particles/beads. There is in both apparatuses an obvious temperature gradient across the furnaces thereof due to the central combusted gases and the cooler air at the walls thereof; however, the main flow of gases and particles/beads is upwardly.

The furnace disclosed in U.S. Pat. No. 3,190,737 is basically an updraught furnace and comprises an open telescope configuration of inter connected cylindrical chambers through which a combustible mixture of gas/air and particles/beads are fed along with a rising current of air at the periphery of the chambers. The air is fed through tangential ports at junctions of the telescoped chambers and swirls upwardly against the walls of the chambers to prevent coalescence and accretion. The flame from the combustible gases is intended to provide heating throughout the entire length of the furnace and the particles/beads are constrained to remain substantially in the central region of the furnace and in fact any straying particles/beads are pushed back into the centre by the action of the swirling cushion of air.

All the above arrangements involve a long "residence time" and the long "residence times" of the particles/beads will lead to undesirably high power consumption rates.

The present invention provides apparatus for heat processing particulate material and comprising a generally cylindrical chamber; means for introducing a first combustible gas or mixture of gases through a burner into the chamber and for igniting said first gas to form a flame of sufficient size and temperature to melt the materials to be processed; means for introducing a current of a second gas or mixture of gases into said chamber generally tangentially of the chamber wall to cause said flame to swirl in the manner of a vortex and provide a quenching zone of gas surrounding said flame; an outlet for exhaust gases, and means for supplying the particulate material into the chamber, characterized in that a ring surrounds the burner and has nozzles for introducing a third gas or mixture of gases at an angle to the axis of the burner thereby assisting said swirling motion.

The injection pipe may house an entraining nozzle which is supplied with gas at high pressure, this gas being emitted into the injection pipe upwardly and so entraining the particulate material. Another swirling nozzle may be provided in the injection pipe above the entraining nozzle, in order to give the entrained material a component of swirl.

Preferably the particulate material is supplied to the injection pipe from a fluidised bed, the material being sucked into the pipe from the bed.

Preferably the burner is located symmetrically about the means for introducing the material to the flame, and may induce a swirling motion in the said first gas before the first gas is combusted. The burner may comprise a generally cylindrical swirl chamber, into which the said first gas is introduced in a substantially tangential direction, a generally cylindrical tube, with a ceramic lining defining a vent, mounted on the swirl chamber, so that both swirl chamber and tube have their axes colinear and generally vertical, and the vent connects to the top of the swirl chamber.

Preferably the first gas passes out of the swirl chamber through a ring of burner nozzles positioned around the injection pipe. There may be an ignition device placed just above these burner nozzles.

The vent may be flared out towards its open end, the walls of the vent opening out in a smooth curve.

Preferably the chamber is arranged with its axis generally vertical, the particulate material is injected upwardly from the lower end thereof, a gas outlet is coaxial with the chamber at the upper end thereof and at least two inlet ports for the said second gas are provided in the peripheral wall of the chamber.

The invention also provides a method of heat processing particulate materials comprising the steps of:

(a) passing a first combustible gas or mixture of gases through a burner;

(b) igniting said first gas to form a flame of sufficient size and temperature to perform the heat processing described;

(c) introducing a plurality of currents of a second gas or mixture of gases in a direction generally perpendicular to, and offset from, the axis of the flame to:
  (i) cause said flame to swirl in the manner of a vortex; and
  (ii) provide a quenching zone of gas surrounding said flame;

(d) introducing particulate material into the swirling flame, in such a manner that the particles enter the flame at or towards the centre thereof, and follow a spiralling path through the flame and thereafter pass into the quenching zone; and (e) collecting the particles that have been heat processed, characterized in that the particulate material is supplied to the chamber from a fluidized bed via an injection pipe, the material being forced through the pipe into the chamber.

Preferably the temperature gradient along a line which is diametrical to the flame is generally in the shape of a top hat, centred on the axis of the flame, to provide a well defined heating zone.

Optionally glass may be used as the material being processed, and preferably the heat processing is arranged to melt the glass particles and then resolidify them once they have become generally spherical in shape to form glass beads.

Preferably the particulate material is fed into the fluidised bed, from whence it is entrained in a gas stream, and carried in an injection pipe through the burner, to be injected upwards into the flame generally along the axis of swirl of the flame.

In one example when the first gas was a propane/air mixture, the temperature of the heating zone was in excess of 1000° C. and that of the quenching zone less than 300° C. and preferably less than 150° C.

In another example, using a propane/air/oxygen mixture as primary gas, the equivalent temperatures were in excess of 1500° C. and less than 500° C., preferably 200° C.

A preferred embodiment of a vortex furnace apparatus suitable for producing glass beads and according to the invention will now be described, by way of example, with reference to the accompanying drawings, in which.

Figure 1:
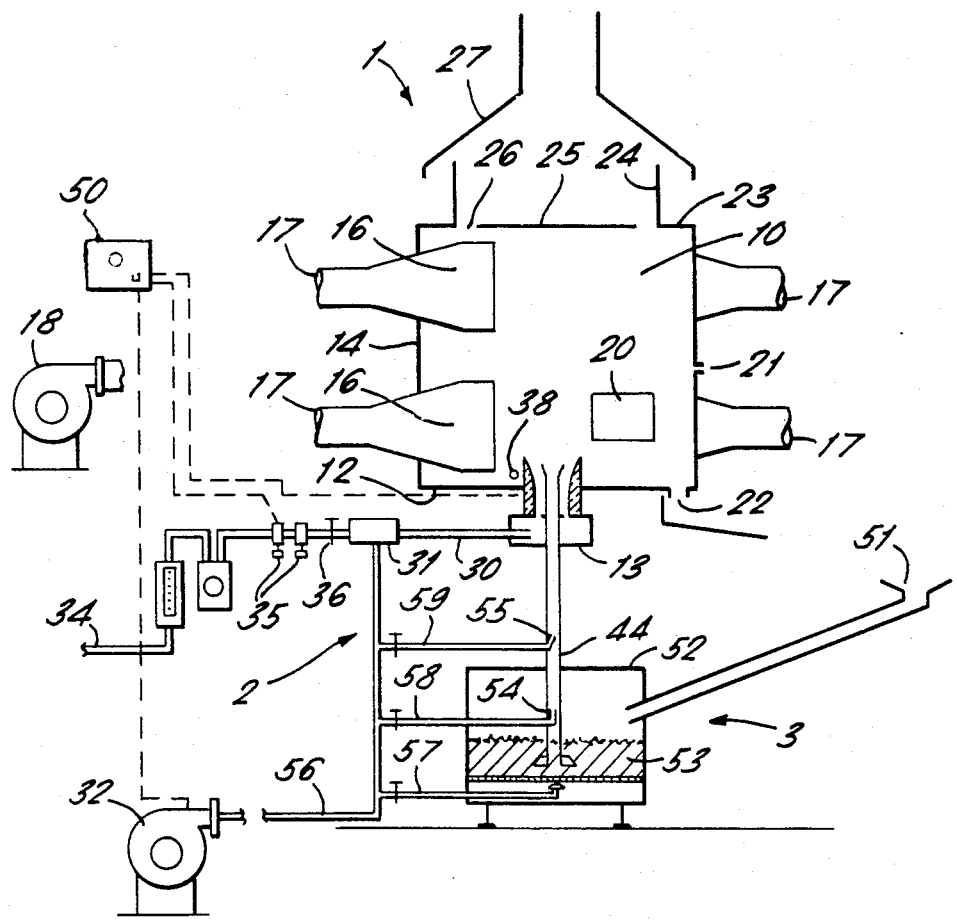
FIG. 1 is a schematic side elevation view of the vortex furnace apparatus.

The drawings show a vortex furnace apparatus specifically for the production of glass beads. The major components of the apparatus shown in FIG. 1 are a furnace 1, a burner assembly and gas supply generally indicated by 2, and a material feed apparatus generally indicated by 3.

The furnace 1 is a substantially cylindrical chamber 10, a lower end wall 12 of which includes a central hole in which the burner assembly 13 is located. The peripheral wall 14 of the chamber has attached thereto four tangentially disposed air inlets 16 arranged in two diametrically opposed pairs, one in the upper half of the chamber 10 and one in the lower half. The inlets 16 taper back to pipes 17 which are connected via a manifold (not shown) to a source of secondary air 18. The source 18 may be a pump of known type with suitable controls for the rate of flow of air to the inlets 16.

An inspection port 20 is provided in the wall 14 of the chamber as is a port 21 into which a thermocouple may be inserted for measuring the temperature within the chamber 10. An outlet port 22 for glass beads is provided in the lower end wall 12 at the periphery thereof.

An upper end wall 23 of the chamber includes a centrally disposed flue 24 the diameter of which is calculated as will be described below. A stop-plate 25 is located in the flue 24 to provide an annular outlet 26 for gases from the chamber and an extractor unit 27 is positioned above the flue. The chamber is fabricated from mild steel and is of approximately equal diameter and height. Alternatively, the height may differ from the diameter.

The burner assembly 13 (which will be described in more detail below) has an inlet 30 for a gas/air mixture to be combusted. The gas and air are mixed in a mixing venturi 31 to which air (primary air) is supplied via pipe 56 by a pump 32 or other suitable means. The combustion gas, usually propane is supplied to the venturi 31 through a line 34 including flow control and metering valves and devices 35 of known type. The line 34 also includes a cut-off valve 36 which automatically operates to close and cut-off the gas supply in the event of failure of certain parts of the system. This prevents accumulation of unburnt gas in the chamber. The valve 36 closes in the event of (a) failure of primary air supply, (b) failure of secondary air supply, (c) flame failure (which is detected by an ultra violet sensitive photocell 38 in the peripheral wall of the chamber).

Figure 2:
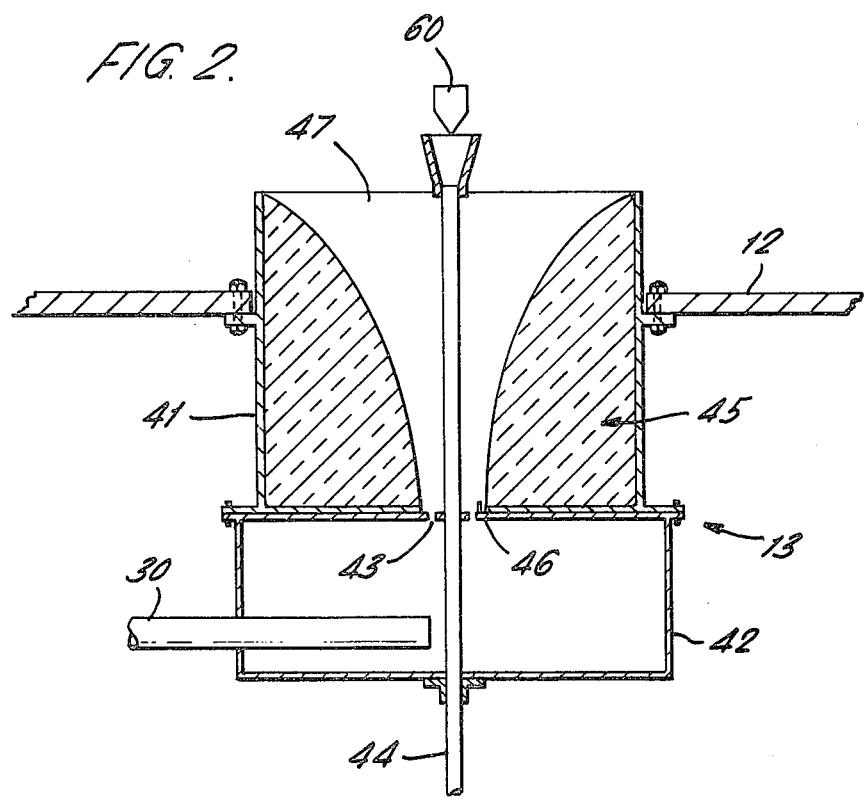
FIG. 2 is an enlarged section through a burner assembly of the apparatus of FIG. 1.

Referring now to FIG. 2, the burner assembly comprises a tube 41, with a ceramic lining 45, mounted on top of a swirl chamber 42, with a glass delivery pipe 44 passing axially through both swirl chamber 42 and tube 41.

Figure 3:
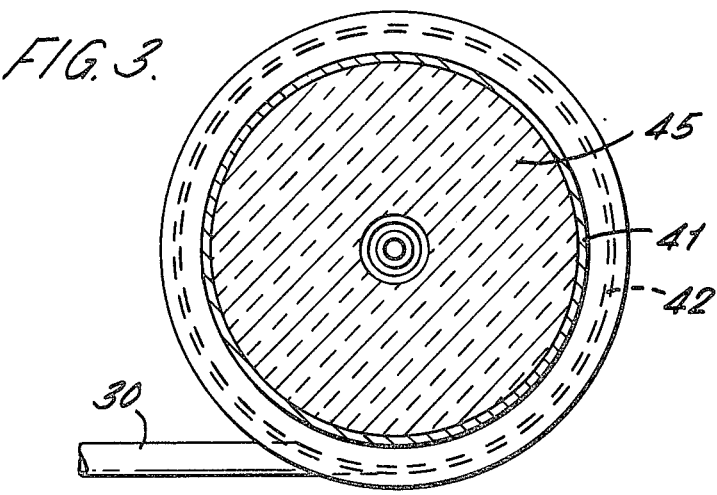
FIG. 3 is a plan view of the burner assembly of the apparatus of FIG. 1.

Inlet 30 introduces the gas into swirl chamber 42 in a substantially tangential direction (see FIG. 3) thus imparting on the gas within the swirl chamber 42 a swirling motion, allowing the primary air and gas to become throughly mixed.

This swirling gas then passes through a ring of nozzles 43. Close by these nozzles is a spark ignition device 46 which ignites the gas. After passing through nozzles 43 the gas proceeds up the vent 47 whose shape is defined by ceramic lining 45.

The material delivery tube 44 also passes through vent 47, through the swirl chamber 42 and projects below this chamber to be connected to the material supply as will be described below.

The spark device as well as the flow of primary air and gas are controlled remotely from control panel 50.

Glass cullet or the material to be processed in the apparatus 1 is supplied from the material feed apparatus 3. Apparatus 3 comprises a bulk hopper 51 which supplies glass cullet continuously into a fluidisation chamber 52.

A continuous and even flow of material to the delivery tube 44 and a deflector cone 60 located thereover is ensured by maintaining a sufficient depth of fluidised material 53 in the chamber. Suction of the glass into the tube and discharge of the material particles into the processor is induced by air flow from the high pressure nozzle 54 supplied with air via pipe 58. Delivery rates, injection velocities and injection heights are controlled by line pressure and tube diameter. Controlled scattering of the particles is achieved by the use of two swirl nozzles, 55 located on the sides of the delivery tube. By admitting air under pressure into the tube from pipe 59 in a tangential fashion, the swirl nozzles 55 reduce the vertical discharge velocity of the material from the delivery tube and cause the material particles to become scattered uniformly throughout the volume of the vortex flame. This ensures efficient use of flame volume and reduces the problem of material accumulation in the processor chamber.

The bed is maintained in a fluidised condition by air passing upwards from a pipe 57. Air is supplied to pipes 57, 58, 59 from the pump 32 through suitable valves.

The material feed apparatus and pipework have been designed or specified for operation at up to 300° C. This will allow pre-heating of the ground glass using waste heat from the vortex chamber flue gases.

Figure 7:
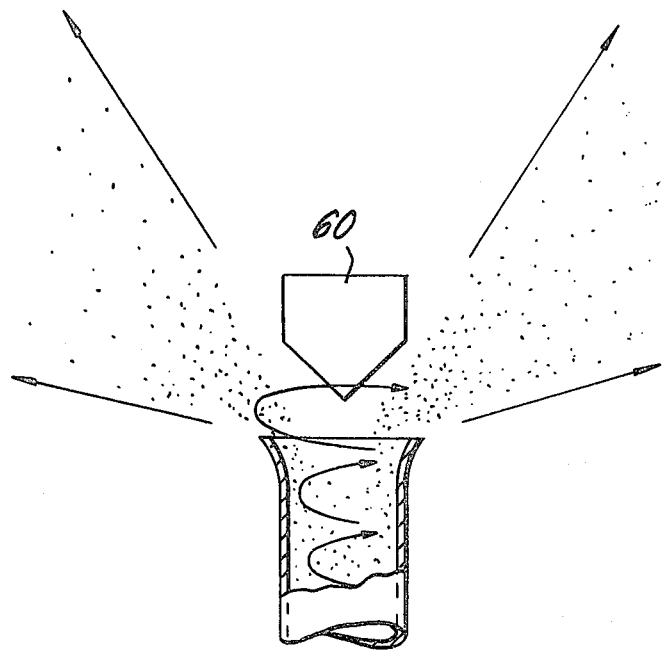
FIG. 7 is an enlarged section through the material injection arrangement of the apparatus of FIG. 1.
Figure 7:
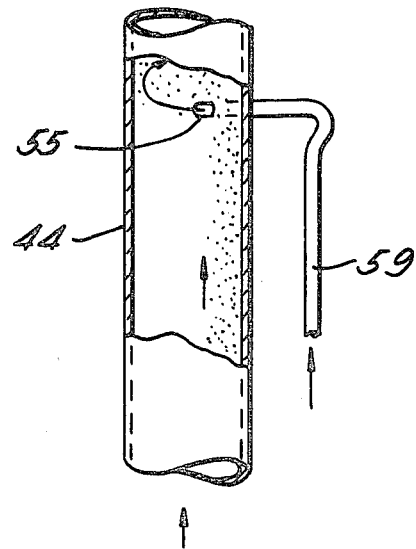

The pressure and flow rate of the air supply are defined by the pipe diameter and material feed rate required. An independent system may be added to assist in controlling the height of the 'fountain' of particles, and this is illustrated in FIG. 7. The upper end of pipe 44 is slightly flared and the deflector cone 60 is positioned (vertex downwards) adjacent the open end of the pipe. To avoid a tendency for material passing up pipe 44 to become localised in one area of the pipe, a source 59 of air under pressure is connected to two swirl nozzles 55 (only one shown) in the pipe 44, as described above.

Figure 8:
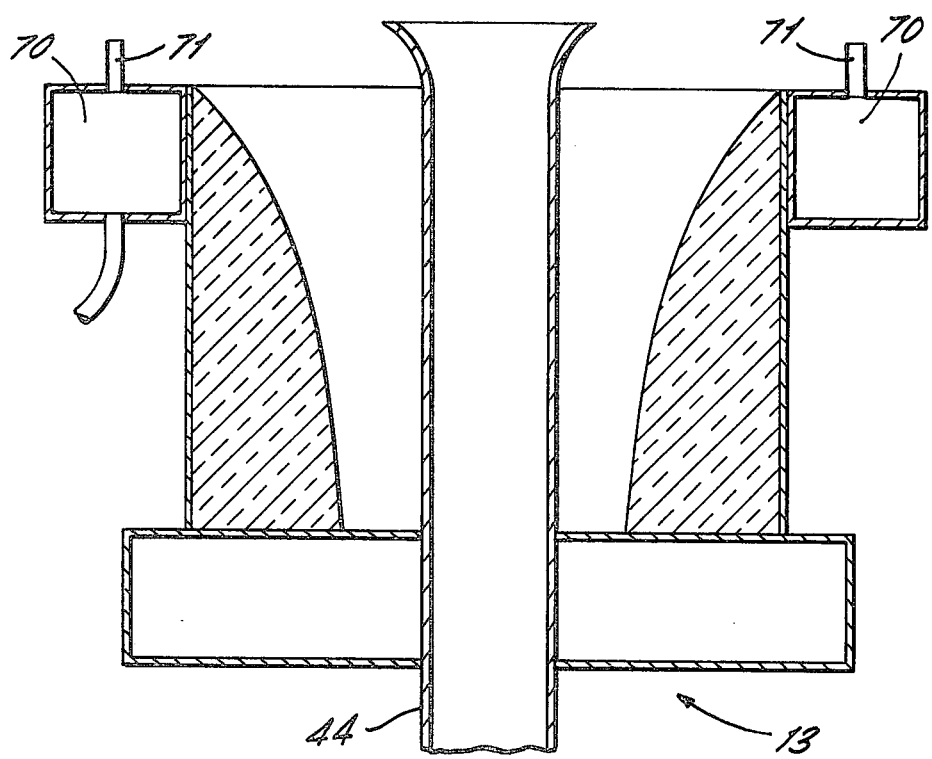
FIG. 8 is an enlarged section similar to FIG. 7 but showing a tertiary air supply arrangement of the apparatus.

A further detail of the apparatus, which again assists in ensuring that the gases in the furnace are swirled satisfactorily to ensure successful processing, is illustrated in FIG. 8. In this Figure, an air supply ring 70 for the supply of tertiary air surrounds the burner 13 and material supply pipe 44 assembly. The ring 10 is co-axial with the pipe 44 and includes a number of air nozzles 71 (only two of which are shown in FIG. 8) spaced around its circumference. There may be as many as thirty nozzles and each of them may have a diameter of 1–4 mm, 3 mm, in the embodiment shown. Each nozzle 71 is arranged at an angle to the vertial of between 10° and 30° (in this embodiment 20°) so that tertiary air supplied to the nozzles will induce a additional swirling effect on the combustible gases emerging from the burner 13. The ring 70 is connected to a source of pressurized air (at 20-80 p.s.i) by appropriate pipe and valve means (not shown).

The operation of the vortex furnace is as follows. The air vortex is created by the tangential secondary air flow entering the cylindrical chamber 10 through the two pairs of diametrically opposite air inlets 16, and is assisted by the tertiary air supply ring 70 as described above.

Figure 4:
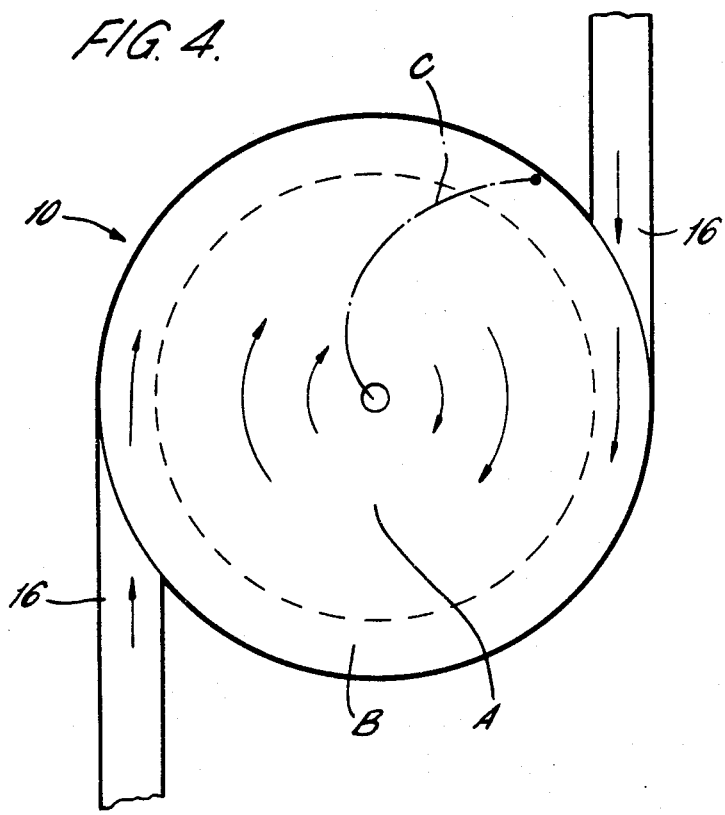
FIG. 4 is a schematic plan view of the furnace chamber of the apparatus of FIG. 1 showing the flight path of a particle within the chamber.
Figure 5:
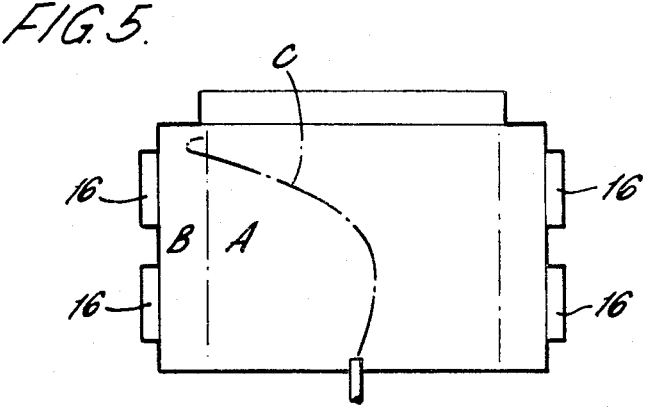
FIG. 5 is a schematic elevation view corresponding to FIG. 4.

With the flame origin at the base of the chamber, a central, very hot and sharply defined cylindrical vortex flame A (see FIG. 4) is generated, and this comprises the central heating zone of the processor. The incoming secondary air flow creates an outer region of cool air B which comprises the cooling zone. This completely surrounds the central hot region of the vortex. Particles of material are injected into the chamber from the centre of the processor base and are allowed to become entrained in the vortex flow. The momentum of the particles and the centrifugial forces acting on the particles cause them to follow a spiral path C upwards and outwards from the base of the processor (FIGS. 4 and 5). While following this spiral path through the chamber the particles pass first through the central heating zone where they attain a temperature of approximately 1000° C. becoming molten and rounded by surface tension effects. The particles pass directly into the surrounding cooling zone where they solidify to become solid spheres before striking the wall of the processor and falling to the processor base. Throughout the process the particles remain discrete and do not collide with each other or with any part of the processor until cooled and solidified when they fall to the base for collection through outlet 22. Guides may be provided in the chamber 10 to divert the processed beads towards outlet 22. The flame is generated from the burner assembly which is located centrally on the base of the chamber. Gas flow is controlled by conventional flow metering equipment, a mixture of propane, natural gas or some other suitable combustible gas, and air is used. The gas/air flow control permits variation of the gas: air ratio and thereby flame temperature as required.

A burner assembly as herein before described has the important advantage of remaining free of glass accumulation during processing of the glass beads. The aerodynamic properties of the burner are such that glass particles and molten droplets are deflected away from the burner and processor base by the force of the flame emerging from the burner vent. The burner and processor are therefore still clean after operation of the machine, and no cleaning or removal of glass accretion is required.

It will be appreciated that the primary air is premixed with the gas for combustion while the secondary air supplied to the tangential air inlets creates the vortex flow and completes the oxygen requirement for combustion.

Two distinct flame conditions can be generated in the chamber 10 and these are referred to as the free and fixed vortex modes. Both flame types are generated from the same or similar burner assemblies and under similar aerodynamic conditions in the chamber. The critical factors governing which of the two will be generated are:

(i) gas flow rate.

(ii) flue and burner design and dimensions. Two distinct regions are identified in the vortex chamber, these are the free and fixed vortex volumes. The central region of the chamber 10, the diameter of which is defined by the diameter of the flue 24, is the fixed vortex volume. The annular-shaped volume surrounding this region and extending to the chamber wall is defined as the free vortex volume.

The following summarises the characteristics of each of the two flame conditions and their respective requirements.

The free vortex condition is less specific in its requirements. This mode is identified by a more confined highly turbulent and intense flame with high heat release rates. It is obtained over a wide range of gas flow rates and has higher rotational velocity. Flame diameter is determined by the diameter of the burner gas outlets 48, For free vortex generation, this must be greater than the diameter of the chamber flue. Flame generation takes place in the outer free vortex volume of the chamber. This type of flame can be generated with or without primary air pre-mixed with fuel gas, and provides an axially compact heating zone with high rotational velocity less suited to the production of glass beads.

The fixed vortex mode is more specific in its requirements. This is identified as a very broad less turbulent but very hot flame with lower heat release rates. Flame diameter is determined by flue dimensions and will normally be about 90% of flue diameter. Flame diameter is highly sensitive to flue dimensions, a narrow flue result in a narrow fixed vortex flame even at high gas flow rates.

With a wide flue opening, for example, 80% of chamber diameter, and sufficient gas flow rate, a wide fixed vortex flame will be obtained. The flame may be 70% of the diameter of the chamber. The sensitive nature of the flame diameter is illustrated by the fact that if the wide flue diameter is capped by a narrow extractor unit 27 placed too close to the top of the vortex chamber, then the flame diameter will be determined by the diameter of the extractor opening, and not by the diameter of the chamber flue.

Fixed mode combustion is stablised in the chamber 10 illustrated by use of a stopped or annular-shaped flue. The circular plate 25 located centrally at the base of the flue chimney creates an annular flue 26 and this has been found to stablise the fixed vortex condition. Typically, the plate will have a diameter approximately 80% of that of the flue opening.

This type of vortex flame is more readily obtained with a primary air supply providing a gas/air mixture for combustion. Flame diameter is determined by flue geometry and not by burner dimensions.

Figure 6:
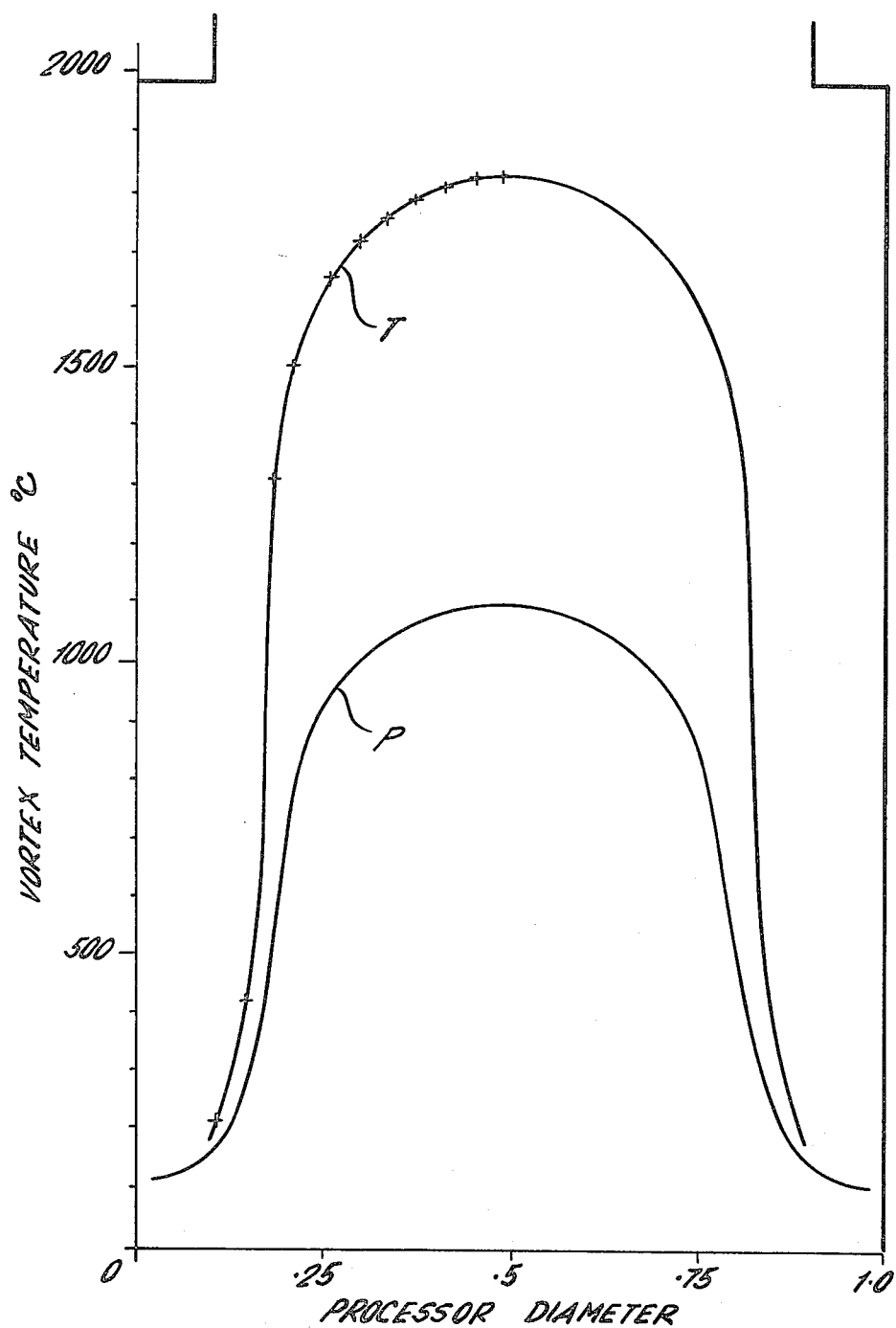
FIG. 6 is a diagram showing the temperature profile with the furnace chamber under two different sets of operating conditions.

The fixed mode creates conditions of heating and cooling ideal for the formation of glass beads. A typical temperature profile obtained for the fixed vortex mode in the chamber 10 is shown in FIG. 6 marked P.

In carrying out the method of manufacture of glass beads according to the present invention the following steps are followed:

(a) a regulated flow of combustible gas is introduced to the chamber 10 via the gas supply means 2;

(b) the gas is ignited to form a concentrated cylinder of flame in the lower portion of the chamber 10;

(c) a regulated current of air is introduced to the chamber 10 via the tangential ports 16 to contribute towards the formation and shape of the flame by causing it to swirl in the manner of a vortex, the current of air also providing a quenching zone of swirling turbulent gas surrounding said flame and being at a temperature approaching ambient temperature;

(d) a regulated quantity of glass cullet is introduced at a predetermined injection velocity into or towards the centre of the swirling cylinder of flame through the injector pipe 44 in such a manner that the particles are entrained in the vortex and constrained to follow the helical spiral path C extending upwardly and outwardly of the chamber towards the peripheral wall thereof, the particles being resident in the swirling flame for sufficient time to become spherulised to form a bead, the bead thereafter passing into the quenching zone where the bead is subjected to cooling effects which harden the outer skin of the bead whereby coalescence of the beads is avoided as is accretion of the beads to the wall of the furnace chamber; and (e) the beads are recovered from the bottom of the chamber to where they fall after spherulisation and solidification.

It will be appreciated that the smaller particles of cullet tend to follow lower, shorter flight paths within the chamber 10 and have a shorter residence time than the larger particles.

The beads produced in the furnace described above, by the method just described, compared more than favourably with beads obtained from known commercial production methods. There is also the added advantage that the beads are produced from an energy input per unit volume of production of beads which is considerably less than fuel consumption rates for known production methods. In fact fuel savings in excess of 50 to 75% can be expected from the method described above depending upon the bead to be produced when compared to prior art methods of producing glass beads.

Still further fuel savings may be obtained by preheating the glass cullet to a temperature of approximately 200°–300° C. The cullet may be so heated using the hot flue gases and an appropriate heat-exchanger system.

In one example of a chamber of 1 meter diameter and 1 meter height, into which a propane/air mixture was fed the operating variables were in the following ranges:

| | |
|---|---|
| Gas flow rate: | 1400–14000 liters/min |
| Primary air flow rate: | 280–7000 liters/min |
| Secondary air flow rate: | 5600–56000 liters/min (1400–14000 liters/min/inlet) |
| Flame temperature: | as shown by line P in FIG. 6 |
| Flame width: | 10 cms–90 cms |
| Glass bead production rate: | Up to 20 kg/min |

In use of this chamber in one particular example, 2.04 Kg of glass cullet was processed through the chamber while 85 liters of propane were burnt. 2.00 kg of glass beads were produced of which 95% were spheres and 5% were flame polished particles or particles of cullet which had not been converted into beads. The energy consumption was approximately 3.6 MJ/kg of beads.

The temperature profile illustrated by Line P in FIG. 6 is particularly suitable for producing glass beads from cullet but higher temperature may readily be achieved in the chamber 10. This can be achieved either by preheating of the primary or secondary air supply or by increasing the oxygen content of the primary air supply by addition of pure oxygen to the combustion gases prior to combustion.

By using oxygen enrichment of the vortex flame, temperatures of approximately 2,000° C. have been generated. A typical temperature profile obtained from this type of flame is shown in FIG. 6 and marked T. Aerodynamic conditions in the chamber are identical to those described above. With the exception of the much greater temperature increase across the flame boundary flame, flame characteristis are essentially identical to those described for the fixed vortex flame.

High combustion temperatures will favour much more rapid heat transfer to any entrained material and greater heating rates will be obtained. While 1,000° C. may be the minimum temperature for successful operation of the process, optimum operating efficiency may well be achieved at higher operating temperatures, say, 1400° C. It has been demonstrated that adjustment of the vortex temperature can be achieved by control of the oxygen content of the gas/air pre-mixture. Increase of the oxygen content allows adjustment of the vortex temperature to generate temperatures of, for example 1400° C. 1,600° C. or 1,800° C. respect. Maximum temperatures of about 2,000° C.–2,500° C. can be expected at the stoichiometric oxygen requirement with primary air pre-heating using propane.

Use of higher vortex temperatures has the additional advantages of higher production rates and/or allowing reduction in processor chamber dimensions.

The higher temperatures may also be utilized to form beads from glass-forming materials rather than glass cullets.

A number of oxides, both metallic and non-metallic have glass forming properties. The most common and the most useful commercially is silica, $SiO_2$, which is used as the basic glass-forming oxide in most commercial glasses.

In one method of manufacturing glass, oxide is heated to temperatures above its melting temperature until completely molten and subsequently cooled or chilled rapidly. With some oxides, providing cooling is sufficiently rapid, a glass will be obtained. With non glass-forming oxides, the oxide will be obtained in crystalline form. Slower cooling of all oxide melts will always result in crystallisation. The cooling rate therefore is critical in the formation of glasses from oxide melts. Glasses are variously described as vitreous, amorphous or non-crystalline. The important characteristic being the absence of crystallinity in their structure. Glasses and crystalline materials are readily distinguished by examination of their respective physical characteristics, in particular their optical and diffraction properties. All glasses are thermodynamically metastable and will always revert with time or thermal treatment to their more stable crystalline forms, for example, the stable crystalline form of silica is quartz.

Of all the pure oxide glasses, silica glass is the most readily formed and the least readily de-vitrified or crystallised. As such comparatively large quantities of the oxides can be added to silica with retention of glass forming properties. Commercial glass contains about 30% by weight of soda ($Na_2O$) and lime (CaO)- so called soda-lime-silica glass.

Other oxides may be added to obtain glasses having different properties, for example; titanium oxide ($TiO_2$) or lead oxide (PbO) to increase refractive index and density, aluminium oxide ($Al_2O_3$) to increase softening temperature and toughness, iron oxides ($Fe_2O_3$) to introduce colour etc.

The process described above but using the temperature profile T is suitable for making beads from glasses having any composition mentioned above.

Using a high temperature process it is possible that glass beads could be made from crushed quartz or directly from a quartz or quartz-rich sand of suitable particle size and quality.

The melting point of quartz (1632° C.) lies well within the temperature range attainable either with oxygen enrichment or air pre-heating.

Beads made from a reasonably pure quartz would effectively be pure silica glass and as such would have substantial chemical and physical durability.

In carrying out the method of bead manufacture utilising the furnace it is believed that the beads are produced at efficiencies which are vastly superior to those available in known furnaces. This results from a combination of circumstances including:

(a) the enhanced combustion of the gas mixture within the chamber. In fact it is considered that the conditions approach those which are regarded as ideal for combustion of gases;

(b) the heat transfer properties of the turbulent conditions within the furnace which enables speedy and effective transfer of heat from the furnace atmosphere to particles of glass;

(c) the aerodynamic control of the flight path of beads within the chamber, viz;
  i. small beads have low and short flight paths; and
  ii. large beads have high and long flight paths;

(d) the density of bead population within the furnace can be dramatically increased i.e. the beads can be much closer together, because the flight paths of the beads are so controllable and this is achieved without increasing the danger of collision between particles and beads thereby avoiding the danger of mutual coalescence of the particles and beads;

(e) the superior cooling characteristics of the air curtain provided adjacent the peripheral wall of the chamber whereby;
  i. faster cooling of the beads is effected; and
  ii. accretion of beads to the furnace wall is obviated; and (f) the provision of the "top hat" temperature gradient diametrically disposed across the furnace when it is in use.

We claim:

1. Apparatus for heat processing glass or glass forming material and comprising a generally cylindrical chamber arranged with its axis generally vertical; means for introducing a first combustible gas or mixture of gases through a burner into the chamber adjacent a lower end of the chamber and for igniting said first gas to form a flame of sufficient size and temperature to melt the materials to be processed; means for introducing a current of a second gas or mixture of gases into said chamber generally tangentially of the chamber wall to cause said flame to swirl in the manner of a vortex and provide a quenching zone of gas surrounding said flame; an outlet for exhaust gases, and means for supplying the material into the chamber, in which a ring surrounds the burner and has nozzles for introducing a third gas or mixture of gases upwardly but at an angle to the axis of the burner thereby assisting said swirling motion.

2. Apparatus as claimed in claim 1, in which the second gas is introduced to the chamber through ports which are positioned in the side of the chamber and admit the gas into the chamber in a substantially tangential direction of the chamber, and the burner and means for supplying glass or glass forming material are positioned adjacent to the lower end of the chamber.

3. Apparatus as claimed in claim 1 in which the glass or glass forming material is fed into the chamber through an injection pipe, the material being entrained in a gas stream, and carried in the injection pipe through the burner, to be injected upwards into the flame generally along the axis of swirl of the flame.

4. Apparatus as claimed in claim 3, in which an entraining nozzle is provided inside the injection pipe, such that when a gas at high pressure is supplied through a supply line to the entraining nozzle, the gas passes through the entraining nozzle into the injection pipe upwards in the direction of the flame, this gas stream causing a reduction of pressure in the injection pipe below the entraining nozzle which sucks material from a supply means and so entrains this material into the gas stream emitting from the entraining nozzle.

5. Apparatus as claimed in claim 4 in which at least one other swirling nozzle is provided inside the injection pipe, above the entraining nozzle, the swirling nozzle being such that when supplied with gas at high pressure from a supply line, the gas is emitted into the injection pipe in a generally tangential direction, to cause the gas stream from the entraining nozzle to swirl.

6. Apparatus as claimed in claim 1 in which the glass or glass forming material supply means comprises a fludisied bed for the material and an injection pipe extending from the bed into the chamber, means being provided for forcing material through the pipe into the chamber.

7. Apparatus as claimed in claim 1 in which the burner is located symmetrically about the means for introducing the glass or glass forming material into the flame, and in which the burner introduces a swirling motion to the said first gas before the said first gas is iginited.

8. Apparatus as claimed in claim 7 in which the burner comprises a generally cylindrical swirl chamber, into which the said first gas is introduced in a substantially tangential direction, a generally cylindrical tube with a ceramic lining defining a vent mounted on the swirl chamber, so that both swirl chamber and tube have their axes colinear and generally vertical, and the vent connects to the top of the swirl chamber.

9. Apparatus as claimed in claim 8 in which the said first gas passes out of the swirl chamber through a ring of burner nozzles positioned around the injection pipe into the vent, the injection pipe passing through and lying along the axis of the swirl chamber and vent.

10. Apparatus as claimed in claim 9 in which an ignition device is placed just above the ring of burner nozzles to ignite said first gas.

11. Apparatus as claimed in claim 9 which the vent defined by the ceramic lining is symmetrical about the axis of the tube, has its narrowest point at the end adjacent the swirl chamber and its widest point at the free end of the tube, the width of the vent between these points varying as a smooth curve.

* * * * *